United States Patent [19]

Che et al.

[11] Patent Number: 4,810,674
[45] Date of Patent: Mar. 7, 1989

[54] POROUS GLASS MONOLITHS

[75] Inventors: Tessie M. Che, Westfield; Raymond V. Carney, Millington; Duane L. Dotson, Parsippany, all of N.J.

[73] Assignee: Hoechst Celanese Corp., Somerville, N.J.

[21] Appl. No.: 149,471

[22] Filed: Jan. 28, 1988

Related U.S. Application Data

[62] Division of Ser. No. 18,256, Feb. 24, 1987, Pat. No. 4,765,818.

[51] Int. Cl.$^4$ ................................................ C03C 3/00
[52] U.S. Cl. ........................................ 501/12; 65/18.1; 65/17; 65/900; 65/901; 501/37; 264/56; 423/338; 252/299.01; 428/307.3
[58] Field of Search ............... 65/900, 901, 18.1, 18.2, 65/18.3, 18.4, 17; 501/12, 37; 264/56; 423/338; 252/299.01; 428/307.3, 376, 401, 1

[56] References Cited

U.S. PATENT DOCUMENTS

| | | | |
|---|---|---|---|
| 3,837,825 | 9/1974 | Loxley et al. | 65/18.1 |
| 3,923,484 | 12/1975 | Randale | 65/18.2 |
| 4,221,578 | 9/1980 | Shoup et al. | 65/901 |
| 4,225,330 | 9/1980 | Kakuzer et al. | 65/18.2 |
| 4,389,233 | 6/1983 | Kurosaki et al. | 65/901 |
| 4,397,666 | 8/1983 | Meshima et al. | 65/17 |
| 4,410,570 | 10/1983 | Kreuzer et al. | 427/163 |
| 4,433,010 | 2/1984 | Pedain et al. | 427/163 |
| 4,440,558 | 4/1984 | Nath et al. | 65/18.2 |
| 4,453,961 | 6/1984 | Berkley | 65/18.2 |
| 4,477,580 | 10/1984 | Fleming, Jr. | 501/12 |
| 4,507,135 | 3/1985 | Morse | 65/18.2 |
| 4,582,751 | 4/1986 | Vasilos et al. | 428/307.3 |
| 4,678,283 | 7/1987 | Kreuzer et al. | 428/1 |
| 4,683,153 | 7/1987 | Goepfeit et al. | 428/1 |

*Primary Examiner*—David L. Lacey
*Assistant Examiner*—L. Johnson
*Attorney, Agent, or Firm*—DePaoli & O'Brien

[57] ABSTRACT

In one embodiment this invention provides novel microporous inorganic oxide glass monolith structures, which have improved mechanical strength and optical transparency. An invention glass monolith is produced by a novel sol-gel process, which utilizes trioxane as an essential additive during the gellation phase, to provide a glass monolith with micropores having uniformity of size and shape.

4 Claims, No Drawings

POROUS GLASS MONOLITHS

This is a division of application Ser. No. 018,256, filed Feb. 24, 1987, now U.S. Pat. No. 4,765,818.

BACKGROUND OF THE INVENTION

The various methods for the manufacture of porous glass are reviewed, in U.S. Pat. No. 4,528,010. The methods include the Vycor (Corning), chemical vapor deposition, white carbon, colloid silica, and silica gel procedures.

One method of production a porous glass body involves (1) forming an article of desired shape from a parent borosilicate glass; (2) thermally treating the glass article at a temperature of 500°–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Embodiments for producing of porous inorganic oxide glass monoliths by leaching of a soluble phase from a solid glass structure are described in U.S. Pat. Nos. 2,106,744; 2,286,275; 2,303,756; 2,315,328; 2,480,672; 3,459,522; 3,843,341; 4,110,093; 4,112,032; 4,236,930; and 4,588,540.

U.S. Pat. No. 4,584,280 describes a process for preparing a transparent porous ceramic film which involves applying an anhydrous solution containing an organometallic compound and a multifunctional organic compound to a substrate; and then thermally decomposing the organic compounds.

A more recent development is the "sol-gel" process for preparation of porous monolithic glasses and ceramics at moderate temperatures. The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures.

Embodiments for production of porous inorganic oxide glass monoliths by the sol-gel process are described in U.S. Pat. Nos. 3,640,093; 3,678,144; 3,681,113; 3,811,918; 3,816,163; 3,827,893; 3,941,719; 4,327,065; 4,389,233; 4,397,666; 4,426,,216; 4,432,956; 4,472,510 (Re. 32,107); 4,477,580; 4,528,010; 4,574,063; and references cited therein; incorporated herein by reference.

Of particular interest with respect to the present invention are publications relating to improvements in sol-gel processing methods for the production of porous glass monoliths.

J. Non-Crystalline Solids, 73, 669 (1985) by Scholze describes organically modified silicate monoliths produced by a sol-gel process; incorporated herein by reference.

Mat. Res. Soc. Symp. Proc., 73, 35 (1986) by Hench et al describes the role of chemical additives in sol-gel processing; incorporated herein by reference. An extensive review entitled "Use of Drying Control Chemical Additives (DCCAs) In Controlling Sol-Gel Processing" by Hench is published in "Science Of Ceramic Chemical Processing", chapter 4; John Wiley & Sons, New York (1986); incorporated herein by reference.

There is increasing interest in the development of novel types of porous inorganic oxide glass monoliths which have unique properties adapted for optical and other specialized applications.

Accordingly, it is an object of this invention to provide novel porous inorganic oxide glass monoliths.

It is another object of this invention to provide a novel sol-gel process embodiment for producing a microporous inorganic oxide glass monolith structure with exceptional properties for specialized optical applications.

Other objects and advantages of the present invention shall become apparent from the accompanying description and examples.

The subject matter of this patent application is related to that disclosed in commonly assigned copending patent applications Ser. No. 015,757, filed Apr. 10, 1987; Ser. No. 015,759, filed Apr. 17, 1987; and Ser. No. 015,758, filed Apr. 10, 1987.

DESCRIPTION OF THE INVENTION

One or more objects of the present invention are accomplished by the provision of a process for producing an inorganic oxide glass monolith composition with a microporous structure which comprises (1) hydrolyzing tetraalkoxysilane under acidic or basic pH conditions in a sol-gel reaction medium comprising water and trioxane until gellation of the reaction medium is completed; (2) heating and drying the gelled medium at a temperature between about 50°–200° C. to remove water and trioxane from the medium and form a microporous glass monolith; and (3) heating the microporous glass monolith at a temperature between about 600°–900° C. to provide a densified microporous glass monolith.

Illustrative of tetraalkoxysilanes and other metals and metalloid alkoxides are methoxy and ethoxy derivatives of silicon, lithium, magnesium, titanium, manganese, aluminum, tin, antimony, and the like. Aryloxy derivatives also can be utilized in the sol-gel process, such as trimethoxyphenoxysilane.

The trioxane and tetraalkoxysilane components in step (1) of the process are employed in a mole ratio between about 0.1–2 mole of trioxane per mole of tetraalkoxysilane.

The water component in the step (1) reaction medium is present in a quantity between about 10–60 weight percent, based on the total weight of the reaction medium. Water is generated during the condensation phase of the hydrolysis-condensation reaction course in step (1).

The step (1) reaction medium can contain a water-miscible organic solvent as an additional component. The solvent can be employed in a quantity between about 5–60 weight percent, based on the total weight of the reaction medium. Alkanol is generated during the hydrolysis and condensation phases of the hydrolysis-condensation reaction course in step (1).

Illustrative of water-miscible solvents which can be employed in a sol-gel process embodiment are alkanols such as methanol and ethanol; ketones such as acetone and methyl ethyl ketone; esters such as methyl acetate and ethyl formate; ethers such as dibutyl ether and tetrahydrofuran; amides such as formamide, dimethylformamide, dimethylacetamide and 1-methyl-2-pyrrolidinone; and the like.

Acidic pH conditions in the sol-gel process can be provided by the addition of mineral acids such as hydrochloric acid, and basic pH conditions can be provided by the addition of bases such as ammonium hydroxide.

Hydrogen fluoride is a particularly preferred acidic pH reagent, because the fluoride anions have a catalytic effect on the hydrolysis and condensation reactions of the sol-gel process.

The step (1) hydrolysis-condensation reaction is conducted at a temperature between about $-10°$ C. and $30°$ C. A reaction temperature between about $-10°$ C. and $20°$ C. moderates the reaction rates of the multiple molecular interactions, and tends to yield a porous glass monolith with superior strength and optical transparency.

It is also advantageous to commence the step (2) heating cycle within a lapsed time period of not more than about ten days after the step (1) gellation reaction is completed. If a gel produced in step (1) of the sol-gel process is allowed to age at room temperature for a lapsed period of time in excess of about ten days before the step (2) heating cycle is commenced, the final microporous glass monolith does not have optimal physical and optical properties.

The step (2) heating cycle of the invention sol-gel process preferably is conducted with a ramp temperature profile ranging from about $50°$ C. to $200°$ C. over a period of about 4-20 days. A "ramp temperature profile" is a programmed increase in temperature over a given temperature range relative to a time period.

The step (3) heating cycle of the invention sol-gel process is conducted over a perid of about 1-6 days.

A glass monolith product of the invention sol-gel process typically is comprised of silica either alone or in combination with up to about 20 weight percent of one or more other inorganic oxides of elements such as lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, selenium, and the like.

A present invention glass monolith microporous structure nominally has a pore volume between about 10–80 percent of the total volume, and has pore diameters in the range between about 15–2000 angstroms. The average pore diameter typically is in the range between about 50–350 angstroms.

The glass monolith can be in the form of thin coatings on transparent or reflective substrates; films; plates; cubes; cylinders; prisms; fibers; and the like.

A typical present invention microporous inorganic oxide glass monolith composition is homogeneous in composition and structure, and is optically transparent.

The term "homogeneous" as employed herein with reference to a porous glass monolith means that the inorganic oxide composition and the microstructure are substantially invariant throughout the monolith.

The term "transparent" as employed herein with reference to a porous glass monolith means that the monolith is transparent or light transmitting with respect to incident fundamental light frequencies and created light frequencies.

A present invention sol-gel derived microporous glass monolith typically has a pore structure in which substantially all of the pores have diameters within about a 100 angstrom diameter variation range, e.g., within a range between about 50–150 or 300–400 or 900–1000 angstroms, as determined by selected sol-gel processing conditions; and the monolith is essentially free of inorganic and organic impurities, e.g., less than 2 weight percent of impurities.

In another embodiment this invention provides a process for producing a composite composition comprising a homogeneous inorganic oxide glass monolith composition with a microporous structure containing an organic component which comprises (1) hydrolyzing tetraalkoxysilane under acidic or basic pH conditions in a sol-gel reaction medium comprising water and trioxane until gellation of the reaction medium is completed; (2) heating and drying the gelled medium at a temperature between about $50°$–$200°$ C. to remove water and trioxane from the medium and form a microporous glass monolith; (3) heating the microporous glass monolith at a temperature between about $600°$–$900°$ C. to provide a densified microporous glass monolith; and (4) impregnating the microporous glass monolith with an organic component to produce a composite composition.

The organic component can occupy between about 1–99 percent of the microporous volume of the glass monolith, and usually it occupies between about 5–95 percent of the microporous volume.

For specialized applications, such as in the form of an optical element in an optical device, the composite composition is transparent and the organic component exhibits an optical response under electromagnetic excitation.

The organic component can be homogeneously distributed throughout the microporous volume. In another embodiment the organic component is concentrated in a zone of the microporous structure which is adjacent to a surface of the glass monolith. As an alternative, the glass monolith can have microporosity in one or more zones, and the microporous volume of one or more zones contains the organic component.

In another embodiment the content of the organic component has a gradient distribution in the microporous structure of an invention glass monolith.

In another embodiment this invention provides a tranparent optical medium which is coated on a transparent or reflective substrate, wherein the optical medium is a composite composition comprising a homogeneous inorganic oxide glass monolith with a microporous structure containing an optically active organic component.

In another embodiment this invention provides an optical light switch or light modulator device with an optical medium component comprising a composite composition consisting of a homogeneous inorganic oxide glass monolith with a microporous structure containing an optically active organic component.

One type of suitable organic component is one which exhibits liquid crystalline properties.

A liquid crystalline component of an invention composite composition can be selected from a broad variety of known compounds, oligomers and polymers which exhibit smectic, nematic and/or cholesteric mesophases.

The mesophase temperature can vary in the broad rang between about $0°$–$150°$ C., depending on the chemical structure of a particular liquid crystal component. Mixtures of liquid crystals can be employed to provide a medium which has a mesophasic state at ambient temperatures.

The liquid crystalline component also can be employed in combination with an organic dye, such as anthraquinone dye D-16 (B.D.H. Chemicals) and azo dye GR-8 (Japan Photosensitive Pigment Research Institute).

Various classes of liquid crystalline compounds are described in U.S. Pat. Nos. 3,322,485; 3,499,702; 4,032,470; 4,105,654; 4,228,030; 4,323,030; 4,323,473; 4,382,012; 4,556,727; 4,576,732; 4,592,858; 4,550,980; 4,601,846; and references cited therein; incorporated herein by reference.

A liquid crystalline component of an invention composite also can have a polymeric structure.

Suitable wholly aromatic thermotropic liquid crystalline polymers are disclosed in U.S. Pat. Nos. 3,526,611; 3,991,013; 4,048,148; 4,057,597; 4,066,620; 4,067,852; 4,075,262; 4,083,829; 4,107,143; 4,118,372; 4,122,070; 4,130,545; 4,146,702; 4,153,779; 4,156,070; 4,159,365; 4,161,470; 4,169,933; 4,181,792; 4,184,996; 4,188,476; 4,219,461; 4,224,433; 4,230,817; 4,238,598; 4,238,599; 4,256,624; 4,332,759; and 4,381,389; incorporated herein by reference.

Side chain liquid crystalline polymers are disclosed in U.S. Pat. Nos. 4,293,435; 4,358,391; and 4,410,570; incorporated herein by reference.

Other literature describing side chain liquid crystalline polymers include J. Polym. Sci., 19, 1427 (1981); Eur. Polym. J., 18, 651 (1982); Polymer, 26, 615 (1985); incorporated herein by reference.

Another type of suitable organic component is one which exhibits nonlinear optical response. The organic component of a present invention optically transparent composite composition can be a small molecule or an oligomer or polymer which exhibits nonlinear optical response.

Illustrative of known nonlinear optically active compounds suitable for the preparation of the composites are 4-nitroaniline, 2-methyl-4-nitroaniline, 4-N,N-dimethylamino-4'-nitrostilbene(DANS), and the like.

Illustrative of other nonlinear optically active compounds are 13,13-diamino-14,14-dicyanodiphenoquinodimethane; 13,13-di(dimethylamino)-14,14-dicyanodiphenoquinodimethane; 13,13-di(n-hexadecylamino)-14,14-dicyanodiphenoquinodimethane; 13,13-ethylenediamino-14,14-dicyanodiphenoquinodimethane; 13,13-di(dimethylamino)-14,14-dicyano-4,5,9,10-tetrahydropyrenoquinodimethane; 13,13-di(n-hexadecylamino)-14,14-dicyano-4,5,9,10-tetrahydropyrenoquinodimethane; and the like.

The synthesis of quinodimethane compounds as listed above is described in copending patent application Ser. No. 748,583, filed June 25, 1985; now U.S. Pat. No. 4,640,800 incorporated herein by reference.

Illustrative of another type of organic component which exhibits nonlinear optical response is a thermoplastic polymer which is characterized by a recurring monomeric unit corresponding to the formula:

where P is a polymer main chain unit, S is a flexible spacer group having a linear chain length of between about 0–20 atoms, M is a pendant group which exhibits a second-order nonlinear optical susceptibility $\beta$ of at least about $5 \times 10^{-30}$ esu as measured at 1.91 m excitation wavelength, and where the pendant groups comprise at least about 10 weight percent of the polymer, and the polymer has a glass transition temperature above about 40° C.

A present invention nonlinear optical composite composition typically is optically transparent and exhibits hyperpolarization tensor properties such as third harmonic generation.

Theoretical considerations in connection with nonlinear optics are elaborated by Garito et al in chapter 1 of the ACS Symposium Series 233 (1983); and by Lipscomb et al in J. Chem., Phys., 75, 1509 (1981), incorporated herein by reference. See also Lalama et al, Phys. Rev., A20, 1179 (1979); and Garito et al, Mol. Cryst. and Liq. Cryst., 106, 219 (1984); incorporated herein by reference.

Novel Aspects Of The Invention Embodiments

An important advantage of the present invention sol-gel process is that it facilitates the production of microporous glass monoliths which have superior optical properties and have at least one diameter of three centimeters or more.

A present invention sol-gel derived microporous glass monolith can have exceptional optical properties because the inorganic matrix is homogeneous in chemical composition and physical structure. Since there is minimized light scattering, the invention microporous glass monolith exhibits excellent optical transparency and light transmitting ability.

The unique aspects of the present invention embodiments mainly derive from the use of trioxane as an essential component of the reaction medium in step (1) of the invention sol-gel process.

If trioxane is not utilized in the sol-gel process, then the resultant microporous glass monolith has inferior physical and optical properties.

If formamide, ethanol, acetonitrile, ethylene glycol, dioxane or other prior art drying control additive is employed instead of trioxane, the resultant sol-gel derived microporous glass monolith does not have optimal physical and optical properties.

A conventional sol-gel derived microporous glass monolith lacks a superior combination of optical properties and mechanical strength, and is susceptible to stress fracturing when immersed in a liquid medium. A present invention microporous glass monolith can be submerged in water for an extended time period and subsequently dried at temperatures up to 200° C. without evidence of stress fracturing from internal capillary pressure.

A conventional sol-gel derived microporous glass monolith does not have a high degree of pore uniformity, as visually evidenced by schlieren. A present invention microporous glass monolith has a exceptional uniformity of pore size distribution.

A conventional microporous glass monolith typically exhibits a higher degree of light scattering than does a present invention glass monolith, when a He-Ne laser beam is transmitted through the monoliths. The degree of scattering increases as the pore uniformity decreases and the pore size increases.

It is believed that superior properties are imparted to a present invention microporous glass monolith by the use of trioxane in the invention sol-gel process because of three factors.

First, trioxane functions as an excellent drying control additive in step (2) of the sol-gel process because it has an ideal vapor pressure for purposes of a controlled slow rate of evaporation under the step (2) drying conditions.

Second, trioxane tends to function as a viscosity enhancing diluent, with a resultant moderation of the sol-gel hydrolysis and condensation reactions.

Third, trioxane has a combination of molecular size, structural conformation and assembly of elements which under sol-gel process conditions may allow the trioxane molecules to function as "templates" which enhance the small size and uniformity of pore formation in the three-dimensional inorganic oxide network.

The following examples are further illustrative of the present invention. The components and specific ingredients are presented as being typical, and various modifications can be derived in view of the foregoing disclosure within the scope of the invention.

EXAMPLE I

This Example illustrates the preparation of microporous glass monoliths in accordance with the present invention.

A first solution is prepared by admixing 19.82 grams (0.22 mole) of 1,3,5-trioxane, 208.33 grams (1.0 mole) of tetraethoxysilane (TEOS) and 189.35 grams (4.11 moles) of ethanol in a 600 cc polymethylpentene beaker.

A second solution is prepared in a polymethylpentene beaker by diluting 0.95 gram of 40% aqueous HF (0.019 mole HF) with 75.64 grams of water (a total of 4.23 moles of water are present).

The second solution is added to the first solution over a period of about two minutes with vigorous stirring. The blended mixture is stirred at room temperatures for a period of about one hour.

The reaction solution is then distributed into 45 polystyrene test tubes (12 cc each) equipped with screw-on caps. The tightly capped samples are maintained at room temperature for 24 hours and then placed upright in an air oven at 50° C. for 24 hours. During the next two 24-hour periods, the caps are first loosened and then removed.

After heating the uncapped tube samples at 50° C. for 24 hours, the rod-shaped gels are transferred to ceramic containers, and placed in a high-temperature air-purged muffle furnace. The gels are then dried and processed according to the following temperature ramp schedule. The rate of temperature increase between treatment temperatures is controlled at approximately 10° C./min.

| Treatment Temperature (°C.) | Duration Period (hours) |
| --- | --- |
| 80 | 72 |
| 225 | 72 |
| 500 | 24 |
| 600 | 24 |
| 700 | 24 |
| 800 | 24 |
| 900 | 24 |

The furnace is cooled to 300° C. before removal of the microporous glass rod products. The rods are stored in a desiccator over dried 3 Å molecular sieve to prevent undesired water absorption. The microporous rods are transparent with no visible defects or "schlieren" in the bulk.

The mechanical strength of the silica network in the invention microporous glass rods is tested by means of a water immersion-infiltration-drying procedure. Sample rods are immersed in distilled water until they are completely infiltrated. The rods are removed from the water and dried at 100° C. in an air oven.

The invention microporous glass rods do not exhibit any evidence of stress fracturing caused by internal capillary pressure.

EXAMPLE II

Microporous glass rods are prepared in accordance with the procedure of Example I, except that no 1,3,5-trioxane is included in the first solution.

The microporous rods are transparent, but extensive "schlieren" is visible in the center portion of the monoliths. Stress fracturing of sample rods occurs when they are subjected to the water immersion-infiltration-drying test.

EXAMPLE III

The preparation of rod-shaped gells is conducted in accordance with the procedure of Example I, except that 19.38 grams of (0.22 mole) 1,4-dioxane is employed in place of 1,3,5-trioxane in the first solution. No product microporous glass rods are obtained within this formulation, since extensive fragmentation of the gel samples occurs during the treatment temperatures of 80° C. and 225° C. as described in Example I.

The Example I procedure is repeated, except that 9.91 grams (0.22 mole) of formamide is employed in place of 1,3,5-trioxane in the first solution. No product microporous glass rods are obtained with this formulation, since extensive fragmentation of the gel samples occurs during the treatment temperature of 225° C. as described in Example I.

The Example I procedure is repeated, except that 13.66 grams (0.22 mole) of ethylene glycol is employed in place of 1,3,5-trioxane in the first solution. No product microporous glass rods are obtained with this formulation, since extensive fragmentation of the gel samples occurs during the treatment temperature of 225° C. as described in Example I.

The Example I procedure is repeated, except that 9.03 grams (0.22 mole) of acetonitrile is employed in place of 1,3,5-trioxane in the first solution. No product microporous glass rods are obtained with this formulation, since extensive fragmentation of the the gel samples occurs during the treatment temperature of 80° C. as described in Example I.

EXAMPLE IV

Microporous glass rods are prepared in accordance with the procedure of Example I, except that the uncapped samples are maintained at 50° C. for 240 hours instead of 24 hours.

The product microporous glass rods are transparent, but extensive "schlieren" is visible in the center portion of the glass rods. Stress fracturing of sample rods occurs when they are subjected to the water immersion-infiltration-drying test.

EXAMPLE V

This Example illustrates the preparation of an inorganic-organic composite in accordance with the present invention.

A microporous glass rod (0.7 cm diameter) is prepared by the Example I procedure, and immersed in molten 2-methyl-4-nitroaniline (135°–140° C.) to impregnate the monolith with the organic compound. After cooling to room temperature, the impregnated glass rod is immersed in a saturated acetonitrile solution of 2-methyl-4-nitroaniline for two hours. The resultant inorganic-organic composite is transparent. The composite is dried in an air oven at 80° C. for 24 hours. The composite contains 15 weight percent of 2-methyl-4-nitroaniline.

The composite is stabilized by immersing it in a solution of 10 grams of methyl methacrylate, 1.0 gram of 2-methyl-4-nitroaniline and 0.1 gram of azobisisobutyronitrile, and the solution medium is heated at 40° C. for 24 hours to promote formation of poly(methyl methacrylate). The polymer is fully cured by additional heating at 40°-50° C. for 48 hours.

The transparent composite monolith is cut and polished using glycerol as a lubricant.

The composite monolith exhibits third order nonlinear optical susceptibility $\chi^{(3)}$, and has utility as an optical component in a light modulating or switching device.

What is claimed is:

1. A microporous glass monolith composition produced in accordance with a sol-gel process which comprises (1) hydrolyzing tetraalkoxysilane under acidic or basic pH conditions in a sol-gel reaction medium comprising water and trioxane until gellation of the reaction medium is completed; (2) heating and drying the gelled medium at a temperature between about 50°-200° C. to remove water and trioxane from the medium and form a microporous glass monolith; and (3) heating the microporous glass monolith at a temperature between about 600°-900° C. to provide a densified microporous glass monolith; wherein the macroporous glass monolith has pore diameters in the range between about 15-2000 angstroms, and pore diameters within the glass monolith are within about a 100 angstom from the largest pore to the smallest pore, and the glass monolith is optically transparent.

2. A microporous glass monolith composition in accordance with claim 1, which has at least one diameter of three centimeters or more.

3. A composite composition consisting of a homogeneous inorganic oxide glass monolith with a microporous structure containing an organic component, produced by a process which comprises (1) hydrolyzing tetraalkoxysilane under acidic or basic pH conditions in a sol-gel reaction medium comprising water and trioxane until gellation of the reaction medium is completed; (2) heating and drying the gelled medium at a temperature between about 50°-200° C. to remove water and trioxane from the medium and form a microporous glass monolith; (3) heating the microporous glass monolith at a temperature between about 600°-900° C. to provide a densified microporous glass monolith; and (4) impregnating the microporous glass monolith with an organic component; wherein the macroporous glass monolith has pore diameters in the range between about 15-2000 angstroms, and the pore diameters within the glass monolith are within about a 100 angstrom from the largest pore to the smallest pore, and the glass monolith is optically transparent.

4. A composite composition in accordance with claim 3, which has at least one diameter of three centimeres or more.

* * * * *